Patented Nov. 21, 1944

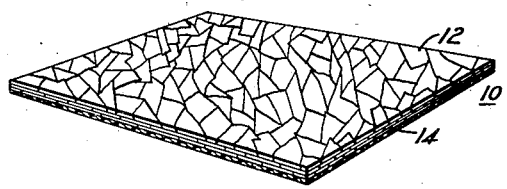
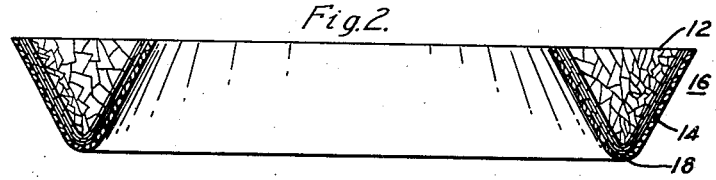
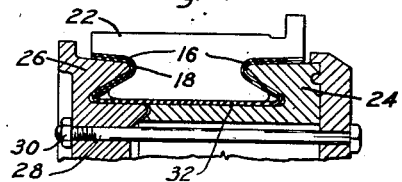
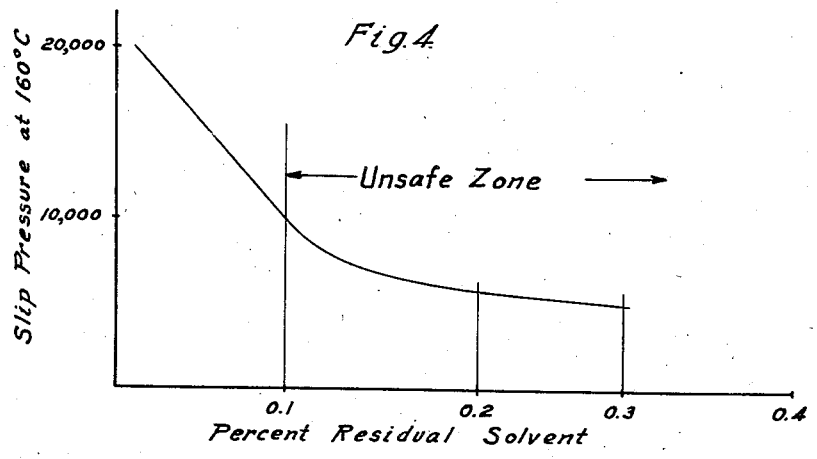
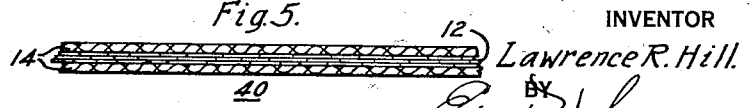

2,363,324

UNITED STATES PATENT OFFICE 2,363,324

ELECTRICAL INSULATION

Lawrence R. Hill, Wilkinsburg, Pa., assignor to Westinghouse Electric & Manufacturing Company, East Pittsburgh, Pa., a corporation of Pennsylvania Application May 23, 1942, Serial No. 444,271

2 Claims. (Cl. 154—2.6)

The present invention relates to composite insulation containing mica. The insulation produced by this invention is particularly suitable for use at high pressures in shapes other than flat sheets.

In high performance, high speed electrical machinery, the electrical insulation employed in the commutators is subjected to high pressures. Bonded mica insulation has been generally employed since it performs more satisfactorily under conditions of high pressure and elevated temperature than other materials.

Recent increases in speeds and performance of dynamo electric machines have entailed increasingly higher operating temperatures as well as greater pressures upon the electrical insulation. When applied to such equipment, mica flakes bonded by shellac binders or equivalents has not stood up satisfactorily under these conditions. The mica insulation has failed mechanically because it has been extruded from position or reduced in thickness because of the slipping of the mica flakes under the pressures and at the temperatures to which it is subjected. For example, when the pressures exceed 6,000 pounds per square inch upon the bonded mica plate at temperatures of 160° C., the material has failed due to such slippage and extrusion. Furthermore, when the mica insulation has been applied as V-ring insulation to commutators in this type of apparatus, there have been failures at the apex of the V where the mica has cracked and separated.

The object of this invention is to provide molded mica insulation for commutators for electrical apparatus to be operated at high speeds.

A further object of this invention is to provide electrical insulation composed of glass cloth, mica flakes and a binder capable of withstanding extreme pressures at elevated temperatures.

Other objects of the invention will, in part, be obvious, and will, in part, appear hereinafter. For a fuller understanding of the nature and objects of the invention reference should be had to the following drawing in which:

Figure 1 is a perspective view of a sheet of composite electrical insulation.

Fig. 2 is a view in elevation of a segment of V-ring insulation.

Fig. 3 is a fragmentary view in cross section of a portion of a commutator structure.

Fig. 4 is a graph plotting percentage of residual solvent in shellac binder in mica insulation against slip pressures at 60° C. and Fig. 5 is a fragmentary cross section of a molded form of electrical insulation.

Heretofore electrical insulation prepared from mica flakes and a suitable binder has been found to be superior to other types of electrical insulation in many respects, particularly for applications where high temperatures and moderate pressures are involved. Numerous types of binders have been employed in preparing sheet insulation from mica flakes, but a shellac binder has, in general, proved to be the most satisfactory material. Therefore a major proportion of the mica sheet employed at the present time is produced with shellac binder.

Since the pressures heretofore applied to bonded mica insulation have been less than 6000 pounds per square inch while the temperatures have not exceeded 160° C. the shellac-mica insulation has been satisfactory. However, in applying wet bonded mica-shellac insulation to recent high performance apparatus, the operating conditions have been so severe that the insulation has failed in a great number of cases. The pressures involved were of the order of 10,000 pounds per square inch, and the temperatures to which the insulation was subjected has ranged up to 160° C. Under these conditions the mica has slipped, extruded or skidded and electrical failure has followed this mechanical failure.

The customary processes of producing mica-shellac insulation employ the wet bonding process in preference to other methods of applying the binder to the mica flakes. The wet bonding process entails the use of an ethyl alcohol solution of shellac, which solution is applied to layers of the mica flakes to produce sheets of predetermined size and thickness. These sheets are treated in an oven to remove practically all of the alcohol solvent. Thereafter the sheets are subjected to temperatures above 80° C. and pressures of the order of from 100 to 2,000 pounds per square inch to cause the shellac to melt and finally polymerize. A solid bonded sheet is produced by the process.

It has been discovered that the prior art wet bonded product is defective in that a small but potent amount of ethyl alcohol residue remains in the shellac. The quantity of alcohol normally present is of the order of 0.2% to 0.3%. Various expedients have been employed in an effort to remove this small proportion of ethyl alcohol. Subjecting the finished sheet to elevated temperatures and evacuation has not been successful. Blisters and puffed areas formed in the insulation which is detrimental to the sheet. It is believed that once the shellac has been polymerized, the residual alcohol is substantially unremovable.

According to this invention, bonded mica insulation containing 0.1% or less of residual solvent such as alcohol may be produced. The physical properties of this material are significantly improved. Referring to Fig. 4 of the drawing, there is plotted the percentage of residual solvent in the shellac-mica composite material against the slip pressures at 160° C. It will be noted that at 0.2% of solvent the slip pressure is approximately 6,000 pounds per square inch at 170° C. This figure corresponds to the best results achieved in mica insulation produced by ordinary processes as practiced heretofore. When the percentage of residual solvent in the shellac binder in the mica plate is reduced to 0.1%, the slip pressure is 10,000 pounds per square inch and at about 0.01% of solvent the slip pressure at 160° C. is about 20,000 pounds per square inch. Accordingly, it is necessary to reduce the percentage of the residual solvent to 0.1% or less if it is desired to produce shellac bonded insulation capable of withstanding pressures of 10,000 pounds per square inch at 160° C.

It has been discovered that mica insulation with 0.1% or less of residual solvent retained by the shellac binder for the mica flakes may be prepared from initial thin sheets of the thickness of 0.005 inch to 0.020 inch bonded together with from 4% to 15% of shellac based on the weight of the sheets, the shellac applied in an alcohol solution to effect satisfactory binding. These thin sheets are much thinner than those normally produced in conventional processes. The thin sheets are subjected to heating while unpressed whereby a major proportion of the alcohol solvent is evaporated. The unpressed, loosely bonded sheets, cut to a convenient handling size, for example, 36 inches by 36 inches, are next stacked in a vacuum oven with spaces between successive sheets. Thereafter the sheets are subjected to evacuation in the oven at a vacuum of approximately 27 inches of mercury in a temperature range of up to 80° C. Under these conditions the residual alcohol is rapidly removed to the desired figure. The oven may be operated at vacua from 20 inches to better than 29 inches of mercury, depending on the evacuating means and the oven temperature. As the oven temperature is increased up to 80° C., the vacuum may be accordingly decreased while effecting efficient alcohol or solvent removal. In any event the temperature to which the shellac is subjected should not exceed 80° C. since shellac begins to polymerize at this temperature and this is undesirable. The evacuation treatment will take from four hours at the higher temperatures and high vacuum, to twenty hours when less powerful solvent removing conditions are employed.

In the specification and claims the term substantially "solvent-free" refers to this product having less than 0.1% alcohol in the shellac.

The individual vacuum treated but unpressed mica sheets may now be stacked in a press in sufficient number to produce the thickness of insulation desired. For most purposes, six sheets of vacuum treated mica are molded into a single insulating sheet or plate in a hot press. For this purpose, a hot press which is capable of applying a pressure of from 8 tons to 150 tons on a 36 inch by 36 inch sheet at temperatures of from 140° C. to 170° C. is employed. From two minutes to four hours in the hot press is required to produce a well bonded sheet of the desired thickness. Thinner sheets operated at higher pressures in higher temperatures are effectively bonded at the shorter period of time, while very thick plates at the lower pressures and temperatures will require the longer period of time.

The flat sheets produced by the hot press are punchable into flat shaped laminations suitable for many purposes. However, in many cases industrial requirements call for shapes other than flat sheets. Therefore, the flat sheet is cut into predetermined shapes and remolded to produce the desired configuration in the electrically insulating material. The remolding of the material is accomplished in the hot press operating at pressure from 100 to 2,000 pounds per square inch in a temperature range of from 140° C. to 170° C.

In preparing shapes molded from flat sheet, it has been discovered that when subjected to the extreme pressures and temperatures of high performance electrical apparatus, these shapes often fail at the sharp corners or bonds of the electrical insulation. For example, the V-ring insulation shown in Fig. 3 as applied to commutators frequently fails at the apex 18 of the V. The failure of the insulation at these sharp corners consists of cracking or splitting, and when this occurs the electrical insulation fails.

It has been discovered that bonded mica flakes may be reinforced to prevent failure when molded into shapes having sharp corners or bonds. Referring to Fig. 1 of the drawing, there is shown a composite reinforced mica insulator 10 comprising a flat sheet 12 of mica flakes bonded with the substantially solvent-free shellac binder herein disclosed. The flat sheet 12 is reinfcroed by applying to one face thereof a layer of fabric produced from glass fibers. The glass fabric is treated with an impregnant which not only fills the interstices between the glass fibers to provide for improved electrical insulation but also provides for a binding medium between the mica sheet and the fabric.

As suitable impregnating media there are polyvinyl alcohol, polyvinyl acetate, polyvinyl acetals, and other vinyl derivatives. Polyvinyl alcohol produced by hydrolyzing a polyvinyl ester to the extent that it is soluble in a solution of equal parts of water and ethyl alcohol has produced satisfactory results. The polyvinyl alcohol treatment increases the tear strength of the glass fiber fabric. The polyvinyl alcohol also is a good adhesive and a highly advantageous composite material has been produced with this material. Polyvinyl acetate applied in an organic solvent adheres to the glass fibers better than many other resins and also is an effective coating and adhesive medium. Vinyl copolymers and other vinyl esters are applicable to the glass cloth, preferably in the form of a solution.

Referring to Fig. 2 of the drawing, there is depicted a molded electrical insulator which may be produced from the sheet 10 of Fig. 1. The molded insulator 16 is a segment of a V-ring such as may be applied to commutators of motors and generators. In the case of small electrical apparatus, a complete V-ring may be molded in one piece. In the case of larger apparatus, the V-ring is preferably formed as a plurality of segments of a circle of the type illustrated. In preparing the V-ring of Fig. 2, a member of predetermined shape is punched from the flat sheet 10 of Fig. 1 and molded under pressure and temperature in molds of suitable shape to produce the segment 16. The best results are obtained if the glass fabric is disposed on the outside of the V with the glass fabric being at the outside apex 18 of the V.

The segment 16 may be applied to commutators as shown in Fig. 3. Each copper commutator segment 22 has front and back V notches into which the molded V-ring insulation 16 is set. A flat strip 32 of shellac bonded mica insulation, with or without glass fabric reinforcement may be applied to insulate the bottom of the commutator from the frame of the electrical device. The commutator and insulation are applied against the backing member 24 having a V mating with the back V of the commutator segments. A V-ring plate 26 is applied to the front V of the commutator segments. Bolts 28 extend from the backing member 24 to the front member 26, and upon applying nut 30 to the bolt and tightening it, pressure is developed between the members 24 and 26. This pressure is imposed on the insulation 16. In the case of high speed electrical apparatus, it is necessary that this pressure be extremely high in order to properly hold the commutator segments 22 when subjected to the high rotational forces.

Structures such as shown in Fig. 3 have been tested in high speed generators. In these generators the insulation has been subjected to pressures of the order of 15,000 pounds per square inch with a copper temperature of about 160° C. In three months of operation and testing, the insulation was completely satisfactory with no observable failure.

The construction of Fig. 1 shows the application of fabric composed of glass fibers applied to one face only of the mica insulation. As shown in Fig. 5 it may be desirable in some cases to apply fabric 14 produced from glass fibers to both faces of the mica sheet 12. The glass fabric on both faces is suitably impregnated with materials capable of adhering to the mica as well as impregnating the interstices of the glass fiber. The insulating member 40 is more effective under mechanical stresses. The member 40 shown in Fig. 5 is particularly desirable at the present time since by its use a saving of up to 30% of large mica splittings is effected. Such large mica splittings are exceedingly difficult to obtain and any saving is vital.

The mica flakes which are employed in preparing the insulation are preferably natural mica which has been prepared free from earth and other impurities. Mica for this purpose is well known in the art and need not be further described. In some cases, synthetic mica material which has characteristics rendering it suitable for this purpose, may be formed into the laminated electrical insulation described herein.

In preparing high grade electrical insulation, the shellac is preferably substantially arsenic-free orange shellac in alcohol solution. Where the laminated material is to be employed for other than electrical insulation purposes, requiring high compressive stresses to be withstood, the shellac need not be arsenic-free. Solutions of from 7% to 40% shellac in ethyl alcohol may be employed in producing the mica sheet. Generally, 25% shellac solutions are most satisfactory for the purpose.

It has been discovered that where the shellac contains more than 0.05% of iron, the laminated material will be subject to slippage and delamination at pressures of above 6,000 pounds per square inch at 160° C., in spite of the removal of residual alcohol to the low percentages herein disclosed. Accordingly, a substantially iron-free shellac, i. e., having less than 0.05% iron, is required to produce insulating material capable of resisting high compressive pressures, that is above about 6,000 pounds per square inch. Iron-free shellac is readily obtainable as an article of commerce.

The laminated sheet is prepared with from 4% to 15% by weight of shellac binder based on the weight of the mica flakes. Less than 4% of shellac binder results in a poorly bonded sheet. When the shellac exceeds 15%, the shellac binder may fail at pressures above 10,000 pounds per square inch in spite of a low residual alcohol content. Accordingly, it is desirable to maintain the shellac binder within these limits.

Since certain changes may be made in the above invention and different embodiments of the invention can be made without departing from the scope thereof, it is intended that all matter contained in the above description or taken in connection with the accompanying drawing shall be interpreted as illustrative and not in a limiting sense.

I claim as my invention:

1. Molded V-ring insulation capable of being applied to commutators of rotating electrical apparatus operating at high speeds, the insulation comprising mica flakes and a binder applied to the mica flakes, the binder composed of substantially solvent-free and iron-free shellac, the shellac containing less than 0.1% solvent, and a reinforcing fabric of glass fibers carrying a polymerized vinyl derivative applied to the mica flakes at the outside of the V to prevent cracking or opening up of the apex of the V under pressure.

2. Molded V-ring insulation capable of being applied to commutators of rotating electrical apparatus operating at high speeds, the insulation comprising mica flakes and a binder applied to the mica flakes, the binder composed of substantially solvent-free and iron-free shellac, the shellac containing less than 0.1% solvent, and a reinforcing fabric of glass fibers adhesively applied to the mica flakes at both sides of the V to prevent cracking or opening up of the apex of the V under pressure.

LAWRENCE R. HILL.